United States Patent
Wan et al.

(10) Patent No.: US 12,468,435 B2
(45) Date of Patent: Nov. 11, 2025

(54) SYSTEMS AND METHODS FOR RECEIVING USER INPUT

(71) Applicant: Ambiq Micro, Inc., Austin, TX (US)

(72) Inventors: Charlene Wan, Austin, TX (US); David Munsinger, Austin, TX (US); Roger Serwy, Austin, TX (US)

(73) Assignee: Ambiq Micro, Inc., Austin, TX (US)

( * ) Notice: Subject to any disclaimer, the term of this patent is extended or adjusted under 35 U.S.C. 154(b) by 149 days.

(21) Appl. No.: 18/465,763

(22) Filed: Sep. 12, 2023

(65) Prior Publication Data
US 2025/0085832 A1 Mar. 13, 2025

(51) Int. Cl.
G06F 3/0482 (2013.01)
G03B 21/00 (2006.01)
G04B 47/00 (2006.01)

(52) U.S. Cl.
CPC .......... *G06F 3/0482* (2013.01); *G03B 21/00* (2013.01); *G04B 47/00* (2013.01)

(58) Field of Classification Search
CPC ..... G06F 3/0482; G06F 3/0484; G03B 21/00; G03B 21/005; G04B 47/00
See application file for complete search history.

(56) References Cited

U.S. PATENT DOCUMENTS

| | | | |
|---|---|---|---|
| 2016/0127624 A1* | 5/2016 | Woo | G06F 3/011 348/36 |
| 2017/0123487 A1* | 5/2017 | Hazra | G06F 3/0482 |
| 2024/0077948 A1* | 3/2024 | Wang | G06F 3/017 |

OTHER PUBLICATIONS

Daiki Matsuda et al., Wearable input/output interface for floor projection using hands and a toe, Dec. 1, 2013, International Conference on Artificial Reality and Telexistence, pp. 122-128 (Year: 2013).*
Vincenzo Ferrari et al., Wearable Light Field Optical See-Through Display to Avoid User Dependent Calibrations: A Feasibility Study, Jul. 1, 2016, pp. 1211-1216 (Year: 2016).*

* cited by examiner

*Primary Examiner* — Tam T Tran
(74) *Attorney, Agent, or Firm* — Nixon Peabody, LLP

(57) ABSTRACT

In some embodiments, apparatuses and methods are provided herein useful to wearable devices. In some embodiments, a device comprises a housing, a display device secured to the housing, wherein the display device is configured to present information to a user, a projection device, wherein the projection device is configured to present a user selectable element outside of the housing of the device, and a sensor, wherein the sensor is configured to detect a selection of the user selectable element by the user.

23 Claims, 7 Drawing Sheets

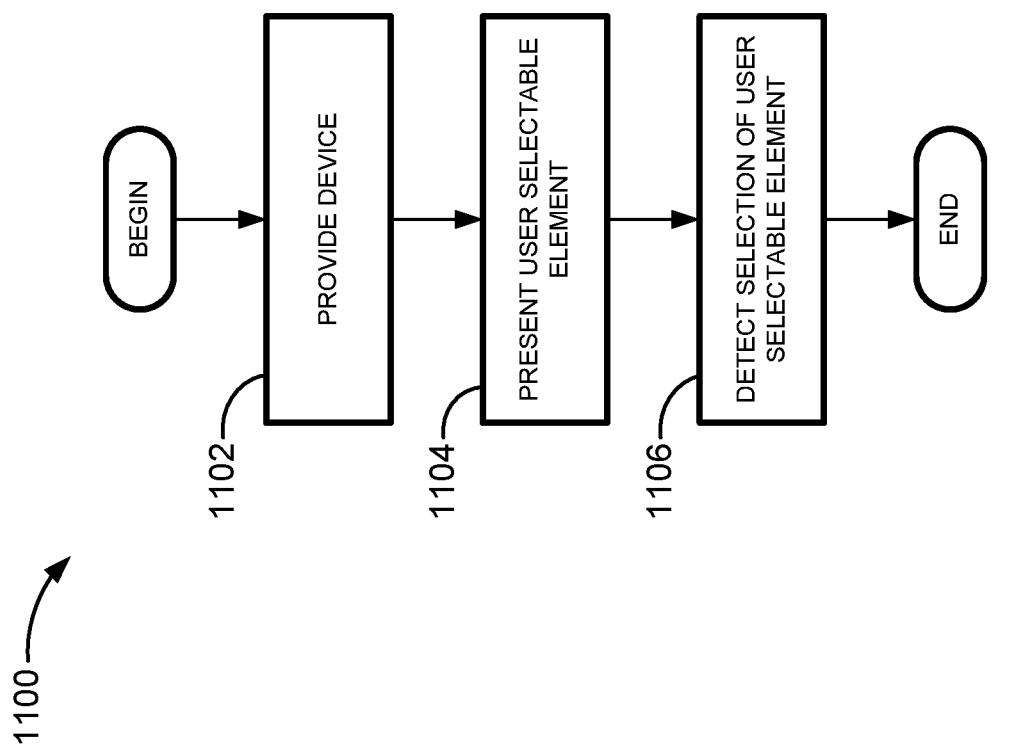

SYSTEMS AND METHODS FOR RECEIVING USER INPUT

TECHNICAL FIELD

This invention relates generally to wearable devices and, more specifically, providing user input to wearable devices.

BACKGROUND

Wearable devices are becoming increasingly popular. One type of popular wearable device is a smartwatch. Smartwatches are typically communicatively linked to a user's mobile device (e.g., smartphone), though some include wireless wide area network (WWAN) connectivity and can operate without the being communicatively linked to a user's mobile device. Wearable devices present information to the user and allow the user to interact with the wearable device, and possibly a communicatively linked mobile device, via the wearable device. For example, in the case of a smartwatch, the smartwatch can present information (e.g., received text messages, emails, incoming calls, etc.) to the user. The user can interact with the smartwatch to take action on the information presented. For example, the user can view a text message, compose a text message, view an email, compose an email, accept an incoming call, place an outgoing call, etc. via the smartwatch.

Many wearable devices are quite small, making them convenient to use and carry. However, due to their size constraints, the physical area to present information is limited. This issue is compounded, as many wearable devices feature display devices that double as user input devices (e.g., touchscreens). Wearable devices that feature display devices that double as user input devices present challenges, because the same area of the wearable that is presenting information to the user also receives the user input. Accordingly, when a user provides user input (e.g., by touching the display device), their finger(s) and/or hand blocks the display device such that the information depicted by the display device is obscured. Accordingly, a need exists for improved input functionality of wearable devices.

BRIEF DESCRIPTION OF THE DRAWINGS

Disclosed herein are embodiments of systems, apparatuses, and methods pertaining wearable devices. This description includes drawings, wherein:

FIG. 11 is a flow chart depicting example operations for receiving a selection of a user selectable element, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

Generally speaking, pursuant to various embodiments, systems, apparatuses, and methods are provided herein useful to wearable devices. In some embodiments, a device comprises a housing, a display device secured to the housing, wherein the display device is configured to present information to a user, a projection device, wherein the projection device is configured to present a user selectable element outside of the housing of the device, and a sensor, wherein the sensor is configured to detect a selection of the user selectable element by the user.

As previously discussed, one of the conveniences of a wearable device is that it is small. Due to its size, it can be worn (e.g., on a user's wrist) and present information to a user without the user needing to retrieve and use their mobile device. However, their small size also creates usability issues. For example, many wearable devices utilize touchscreens. While this is an efficient use of the limited space available on a wearable device, it presents challenges for users. Specifically, when a user attempts to interact with their wearable device by touching the display device (i.e., a touchscreen), the user's finger(s) and/or hand may obscure the information presented by the display device. Disclosed herein are systems, methods, and apparatuses that seek to minimize, if not eliminate, these problems.

In one embodiment, a wearable device is capable of receiving user input from a user outside of the wearable device. For example, the wearable device can present user selectable elements outside of a housing of the wearable device (e.g., on a user's wrist). The user can then provide user input (e.g., via a touch, gesture, etc.) outside of the housing of the wearable device. In such embodiments, the user input does not obscure, or minimally obscures, the display device of the wearable device, as the user does not need to provide user input on the wearable device. The discussion of FIG. 1 provides an overview of such a wearable device.

Figure 1:
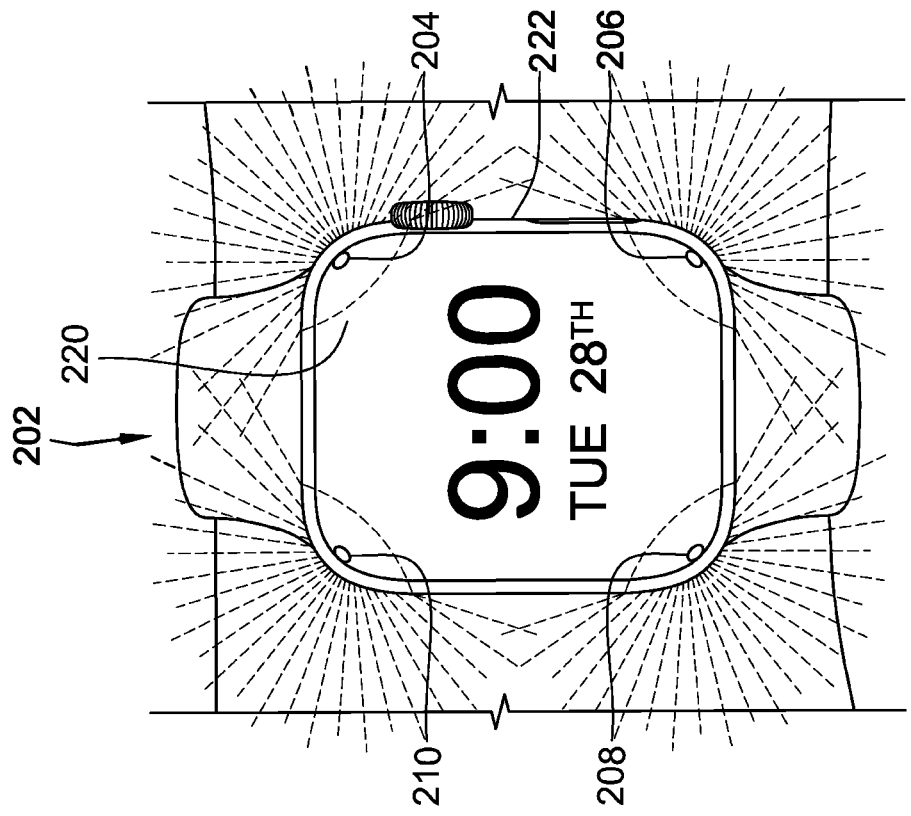
FIG. 1 depicts a wearable device 102 presenting a plurality of user selectable elements, according to come embodiments.

FIG. 1 depicts a wearable device 102 presenting a plurality of user selectable elements, according to come embodiments. As depicted in FIG. 1, the wearable device 102 includes a housing 122 and a display device 120. The housing 122 can be made of any suitable material (e.g., metal (e.g., aluminum, titanium, steel, etc.), ceramic, plastic, etc.). The display device 120 can be of any suitable type (e.g., a liquid crystal display (LCD), light emitting diode (LED) display, and organic light emitting diode (OLED) display, etc.). In some embodiments, the display device 120 can also act as a user input device (e.g., the display device 120 can be a touchscreen). The display device 120 is configured to present information to a user of the wearable device 102. For example, the display device 120 can present time information, date information, fitness tracking information, messaging information (e.g., short message service (SMS) messages, multimedia message service (MMS) messages, etc.), phone information (e.g., notifications of incoming calls, phone books, outgoing call menus, etc.), etc. The information presented by the display device 120 can be generated by the wearable device 102 and/or generated by another device (e.g., a mobile device that is communicatively coupled to the wearable device). Additionally, in some embodiments, the wearable device 102 can include additional user input mechanisms, such as hard buttons.

As depicted in FIG. 1, the wearable device 102 includes a plurality of projection devices: a first projection device 112, a second projection device 114, a third projection device 116, and a fourth projection device 118. It should be noted that, though the example depicted in FIG. 1 includes four projection devices, embodiments are not so limited. That is, the wearable device 102 can include greater, or fewer than, four projection devices (e.g., one projection device, two projection devices, three projection devices, five projection devices, ten projection devices, etc.). The projection devices are configured to present user selectable elements. For example, as depicted in FIG. 1, the first projection device 112 presents a first user selectable element 104, the second projection device 114 presents a second user selectable element 106, the third projection device 116 presents a third user selectable element 108, and the fourth projection device 118 presents a fourth user selectable element 110. It should be noted that there need not be a one-to-one correspondence between the projection devices and the user selectable elements. For example, one or more of the projection devices can present more than one user selectable element. The projection devices can be of any suitable type. For example, the projection devices can be light-based (e.g., based on the visible light spectrum).

In some embodiments, the projection devices present the user selectable elements outside of the housing 122 of the wearable device 102. For example, in the case of a smartwatch, the projection devices can present to the user selectable elements on the user's wrist (e.g., arm, forearm, etc.) and/or hand. As another example, in the case of a smarting, the projection devices can present the user selectable elements on the user's fingers and/or hand. As previously discussed, in one embodiment, the projection devices are light-based. In such embodiments, the projection devices emit light and the user selectable elements are indicated by the light emitted from the projection devices. The light emitted by the projection devices can be monochromatic and/or contain color. In some embodiments, the projection devices are capable of emitting light at a number of frequencies, and thus, in multiple colors. Accordingly, in such embodiments, the user selectable elements may be visually distinguishable from one another. For example, the user selectable elements can be visually distinguishable from one another based design, shape, color, size, position, transparency, location, etc. The user can select one or more of the user selectable elements to interact with the wearable device 102. For example, the user can indicate a selection of one of the user selectable elements via a hand gesture (e.g., tapping, swiping, etc.) in the region of the user selectable element.

Figure 2:
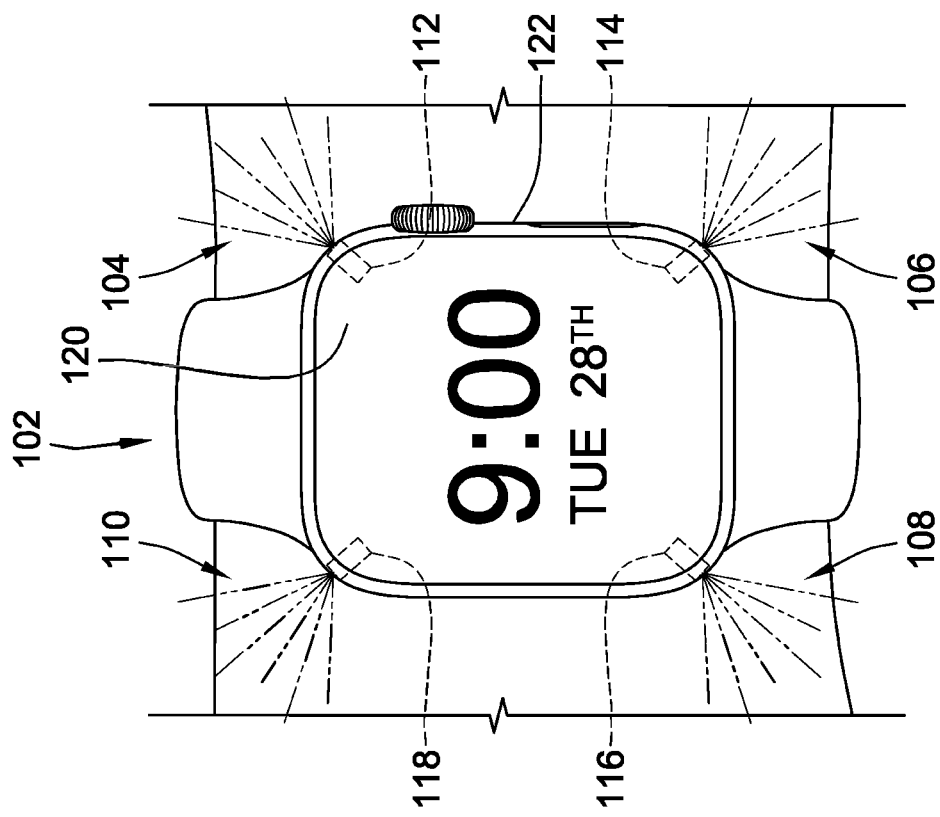
FIG. 2 depicts a wearable device 202 including a plurality of sensors configured to detect user input, according to some embodiments.

While the discussion of FIG. 1 provides an overview of a wearable device including a plurality of projection devices, the discussion of FIG. 2 provides additional detail regarding the detection of user input via user selectable elements.

FIG. 2 depicts a wearable device 202 including a plurality of sensors configured to detect user input, according to some embodiments. Like the wearable device depicted in FIG. 1, the wearable device 202 depicted in FIG. 2 includes a housing 222 and a display device 220. In addition to the projection devices (depicted in, and described in more detail with respect to, FIG. 1), the wearable device 102 includes a plurality of sensors. The sensors are generally configured to detect selection of user selectable elements. In the example depicted in FIG. 2, the wearable device 202 includes four sensors: 1) a first sensor 204; 2) a second sensor 206; 3) a third sensor 208; and 4) a fourth sensor 210. It should be noted that, while the example depicted in FIG. 2 includes four sensors, embodiments are not so limited. That is, the wearable device 202 can include greater, or fewer, than four sensors (e.g., one sensor, two sensors, three sensors, five sensors, ten sensors, etc.). Further, it should be noted that there need not be a one-to-one correspondence between the number of projection devices and sensors. The sensors can be of any suitable type. For example, the sensors can be proximity sensors, capacitance sensors, optical sensors, audio sensors, accelerometers, gyroscopes, magnetometers, pressure sensors, etc. Accordingly, the sensors can detect selection of the user selectable elements by any suitable means.

Figure 4:
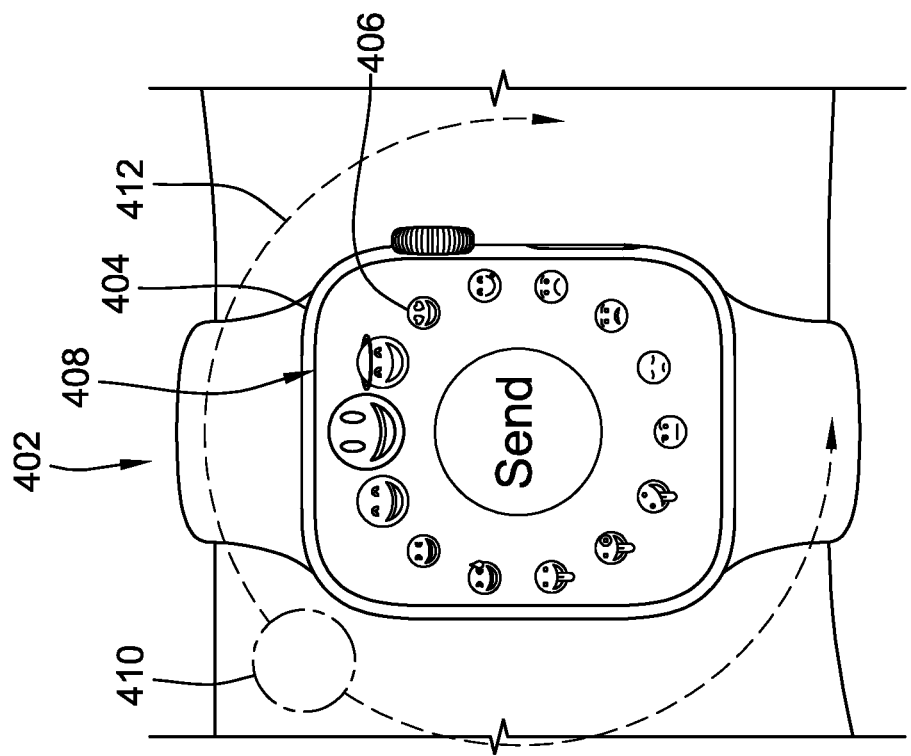
FIG. 4 depicts a user providing user input 410 to a wearable device 402, according to some embodiments.
Figure 3:
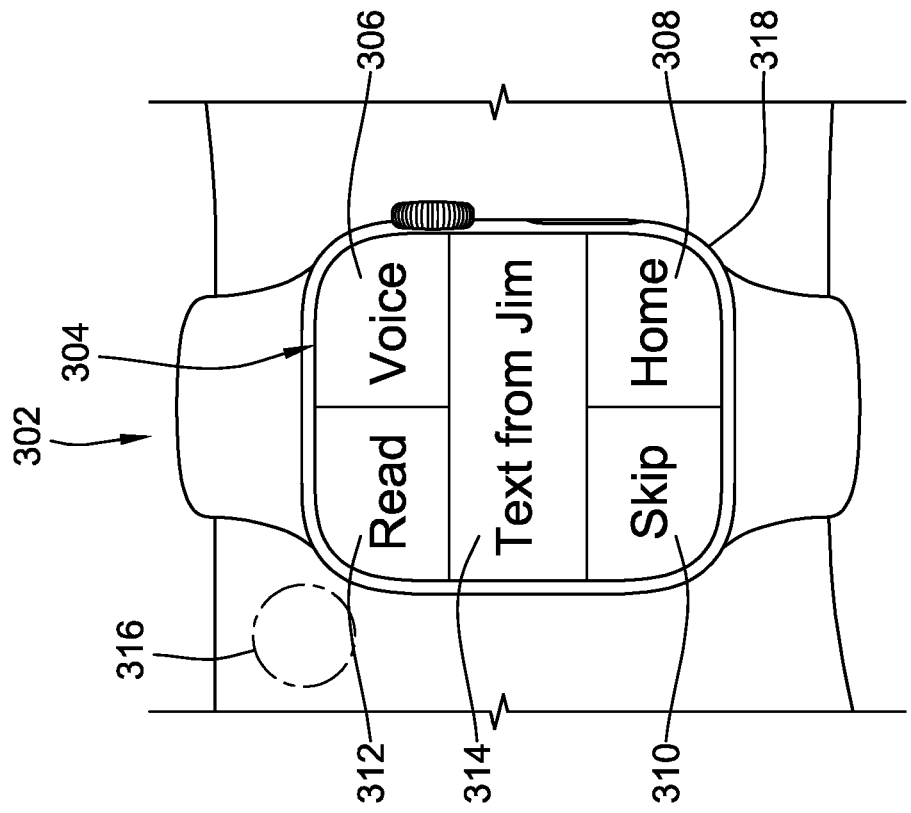
FIG. 3 depicts a wearable device 302 presenting information to a user via a display device 304 and receiving user input 316 outside of a housing 318 of the wearable device 302, according to some embodiments.
Figure 5:
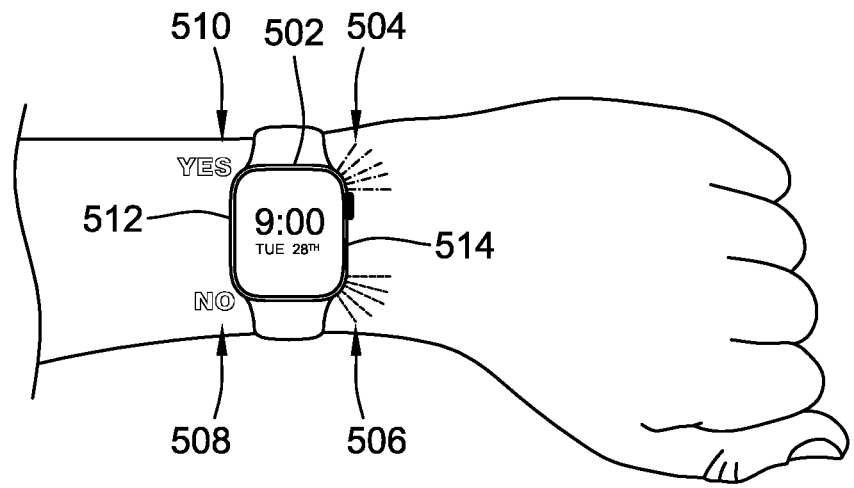
FIG. 5 depicts a wearable device 502 presenting a plurality of user selectable elements, according to some embodiments.

While the discussion of FIGS. 1-3 provides background regarding a wearable device including projection devices and sensors, the discussion of FIGS. 3-5 provides additional detail regarding the receipt of user input for such a wearable device.

FIG. 3 depicts a wearable device 302 presenting information to a user via a display device 304 and receiving user input 316 outside of a housing 318 of the wearable device 302, according to some embodiments. As depicted in FIG. 3, the wearable device 302 includes the display device 304 and the housing 318. The display device 304 is presenting information to the user including a user interface. The user interface includes a number of sections: 1) a first section 306; 2) a second section 308; 3) a third section 310; 4) a fourth section 312; and a fifth section 314. Each of the sections is associated with a selection or message. For example, as depicted in FIG. 3, the first section 306 is associated with a voice selection, the second section 308 is associated with a home selection, the third section 310 is associated with a skip selection, the fourth section 312 is associated with a read selection, and the fifth section 314 is associated with a received message. In this example, the user interface is presenting information associated with a text message received from a contact "Jim."

As discussed with respect to FIGS. 1 and 2, the wearable device 302 can include projection devices and sensors (not shown). The projection devices and/or sensors are located within and/or on the housing 318. The projection devices present user selectable elements outside of the housing 318 of the wearable device. Accordingly, a user can make a selection of the one of the user selectable elements via a gesture outside of the housing 318 of the wearable device 302. In one embodiment, each of the sections is associated with one of the user selectable elements. That is, the projection device(s) can present user selectable elements for each of the sections, though this is not required (e.g., some of the sections may not have associated user selectable elements). As an example, and as contemplated by FIG. 3, the wearable device 302 can present four user selectable objects: 1) a first user selectable element associated with the first section 306; 2) a second user selectable element associated with the second section 308; 3) a third user selectable element associated with the third section 310; and 4) a fourth user selectable element associated with the fourth section 312. In some embodiments, selection of a user selectable element causes the same action to be performed by the wearable device 302 as a selection of one of the sections on a touchscreen device. For example, as indicated by indicium 316, the user has provided user input associated with the fourth user selectable element. The user input associated with the fourth user selectable element causes a "read" action to be performed. That is, assuming that the wearable device 302 includes a touchscreen (or other user input device), the user input associated with the further user selectable element (i.e., selection of the fourth user selectable element) causes the same action to be performed by the wearable device 302 as a selection of the fourth section 312. It should be noted that, although there is a one-to-one correspondence between the user selectable elements and the sections, such is not required. That is, the user selectable elements need not be redundant with respect to the sections. In such embodiments, the number of user selections may be greater than the number of selections presented by the display device 304.

While the discussion of FIG. 3 describes user input associated with a specific section of a user interface, the discussion of FIG. 4 describes user input associated with a user interface generally.

FIG. 4 depicts a user providing user input 410 to a wearable device 402, according to some embodiments. The wearable device 402 includes a display device 408 and a housing 404. The display device 408 is presenting a circular user interface including a plurality of icons 406. The icons 406 can be of any suitable type. For example, the icons 406 can represent input to be provided, such as menu selections, text selections, volume selections, navigation selections, etc. As depicted in FIG. 4, the icons 406 are emojis. A user can scroll through the circular menu via input that is outside of the housing 404 of the wearable device 402.

As depicted in FIG. 4, the user is providing user input, indicated by indicium 410 near a top-left portion of the housing 408. The user can scroll through the circular menu by providing a gesture, for example, around the wearable device 402, as indicated by arrow 412. As the user moves their finger, as indicated by the arrow 412, the icons 406 move about the circular user interface correspondingly. The user can continue moving their finger around the wearable device 402 until the desired icon 406 is located in a selection position (e.g., at a top) of the circular user interface. In some embodiments, the user can perform a second gesture to select the desired icon 406. For example, the second gesture could be a tap outside of the housing 404 or on the display device 408 (assuming the display device is also capable of receiving user input). Additionally, or alternatively, the user can select the desired icon 406 via a press of a hard button of the wearable device 402.

As discussed previously, the wearable device 402 can include a number projection devices and/or sensors (not shown). The projection device, if present, can present one or more user selectable elements. For example, the user selectable elements could be arrows or other indicia that indicate that the user can perform a specific gesture to interact with the circular user interface. The sensors are configured to detect the user's selection (e.g., gestures associated with the circular user interface and/or a selection of the desired icon 406). It should be noted that while the example depicted in FIG. 4 includes a circular user interface, embodiments are not so limited. For example, the user interface could be linear in a vertical and/or horizontal manner. In such embodiments, the user gesture could be generally linear to navigate the user interface.

FIG. 5 depicts a wearable device 502 presenting a plurality of user selectable elements, according to some embodiments. The wearable device 502 includes a display device 512 and a housing 514. Like the wearable devices discussed previously, the wearable device 502 includes one or more projection devices (not shown) and one or more sensors (not shown). The projection devices are generally configured to present user selectable elements outside of the housing 514 of the wearable device 502. The sensors are generally configured to detect selection of the user selectable elements by a user.

As depicted in FIG. 5, the wearable device 502 (i.e., the projection devices of the wearable device 502) is presenting four user selectable elements: 1) a first user selectable element 504; 2) a second user selectable element 506; 3) a third user selectable element 508; and a fourth user selectable element 510. It should be noted that, although the example depicted in FIG. 5 includes four user selectable elements, embodiments are not so limited. For example, the wearable device 502 can present greater, or fewer, than four user selectable elements. The number of user selectable elements can be based on the hardware (e.g., the number of projection devices) and/or the user interface presented via the display device 512. For example, if the user interface includes three user selections the wearable device 502 can present three user selectable elements, if the user interface includes eight user selections the wearable device 502 can present eight user selectable elements, etc.

The user selectable elements can be distinguishable from each other in any suitable manner. As one example, the user selectable elements may look the same and be visually distinguishable based only on their location. In such embodiments, the locations of the user selectable elements may correspond with user interface elements. Alternatively, one or more of the user selectable elements may looks different from others of the user selectable elements. For example, the user selectable elements may have different colors, shapes, sizes, etc. Additionally, or alternatively, the user selectable elements may include text (e.g., words, numbers, symbols, etc.) and/or icons (e.g., emojis). As depicted in FIG. 5, the user selectable elements are visually distinguishable based on location and their appearance. For example, the first user selectable element 504 includes a first color (as indicated by a first type of dashed lines), the second user selectable element 506 includes a second color (as indicated by a second type of dashed lines), the third user selectable element 508 includes a first word (i.e., the word "no"), and the fourth user selectable element 510 includes a second word (i.e., the word "yes"). The user can select the user selectable elements via gesture (e.g., a tap, swipe, press, etc.) of the user selectable elements outside of the housing 514 of the wearable device.

Figure 6:
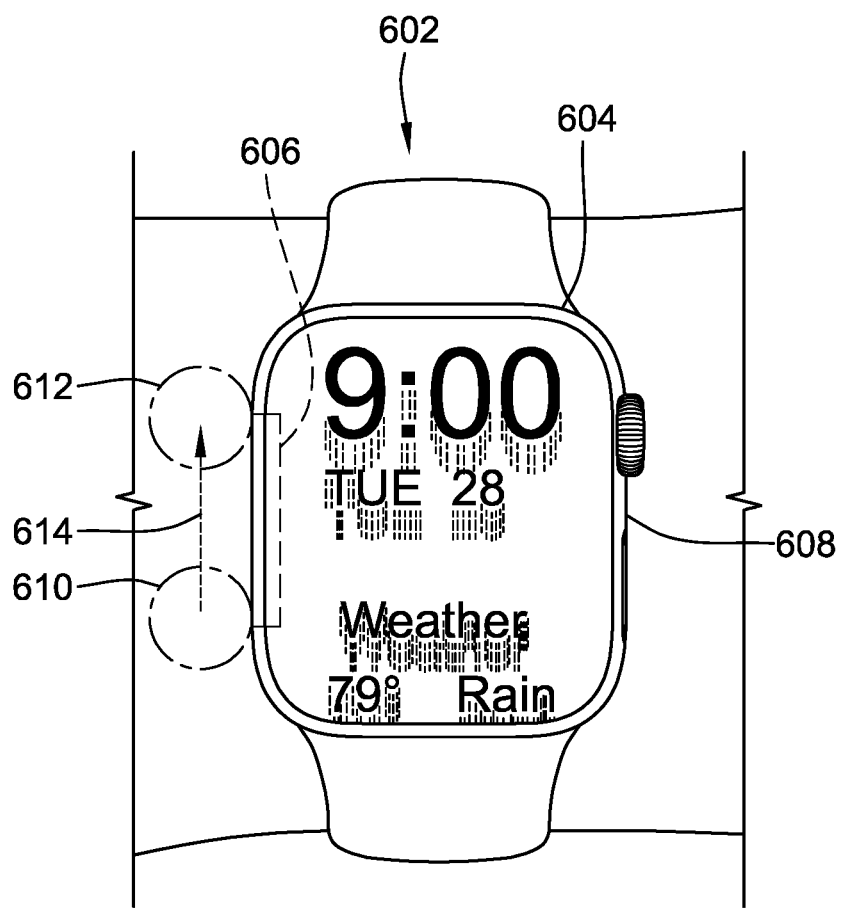
FIG. 6 depicts a user providing user input to a wearable device 602, according to some embodiments.

While the discussion of FIGS. 1-5 describes a wearable device configured to receive user input outside of a housing of the wearable device, the discussion of FIG. 6 provides additional detail regarding providing user input to a wearable device on a housing of the wearable device.

FIG. 6 depicts a user providing user input to a wearable device 602, according to some embodiments. The wearable device 602 includes a display device 604 and a housing 608. In some embodiments, the wearable device 602 can include one or more projection devices and sensors, similar to those described with respect to FIGS. 1-5. Additionally, as depicted in FIG. 6, the wearable device 602 includes a sensor 606. The sensor 606 is located within the housing 608 of the wearable device. For example, in the case of a smartwatch, the sensor 606 can be located in a bezel of the wearable device 602 (i.e., smartwatch). The sensor 606 is configured to detect user input. Because the sensor 606 is located within the housing 608 of the wearable device 602, the user's interaction with the sensor 606 (i.e., providing user input detected by the sensor 606) may obscure the display device 604 less than if the user were providing user input via the display device 604.

The sensor 606 can be of any suitable type. For example, the sensor 606 can be a capacitance sensor, an optical sensor, an audio sensor, etc. In any case, the sensor 606 is configured to detect touch or proximity (e.g., gestures near the wearable device 602) input from a user. As depicted in FIG. 6, the user is providing user input as a gesture. The gesture begins at a first indicium 610 and ends at a second indicium 612. As indicated by an arrow 614, the user is moving their finger from a location indicated by the first indicium 610 to a location indicated by the second indicium 612 as a gesture. This gesture causes the information presented by the display device 604 to scroll, as indicated by the "shadows" on the information presented on the display device 604.

Figure 7:
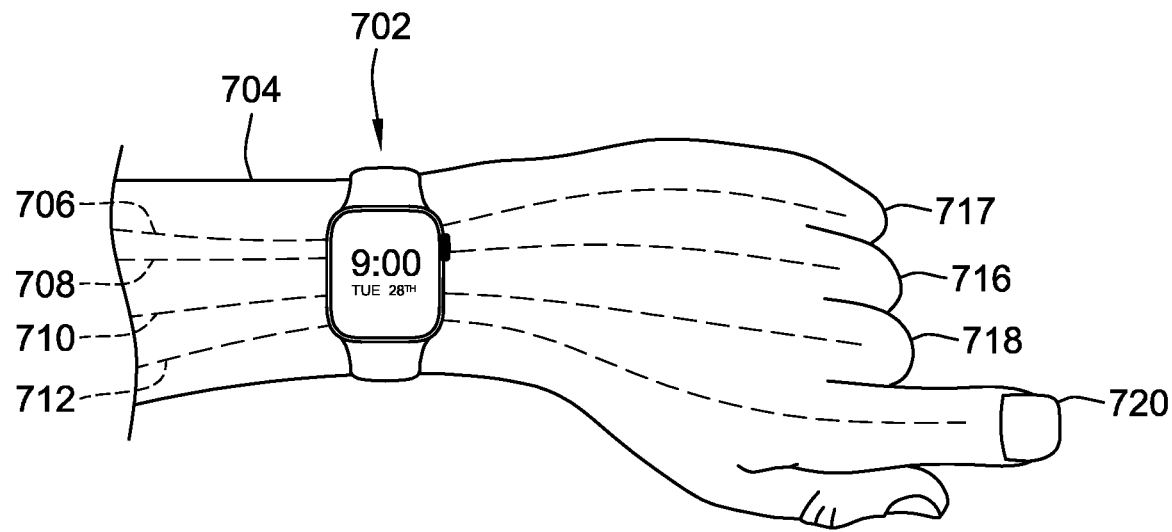
FIG. 7 depicts a wearable device 702 receiving user input via tendon movement of a user, according to some embodiments.
Figure 8:
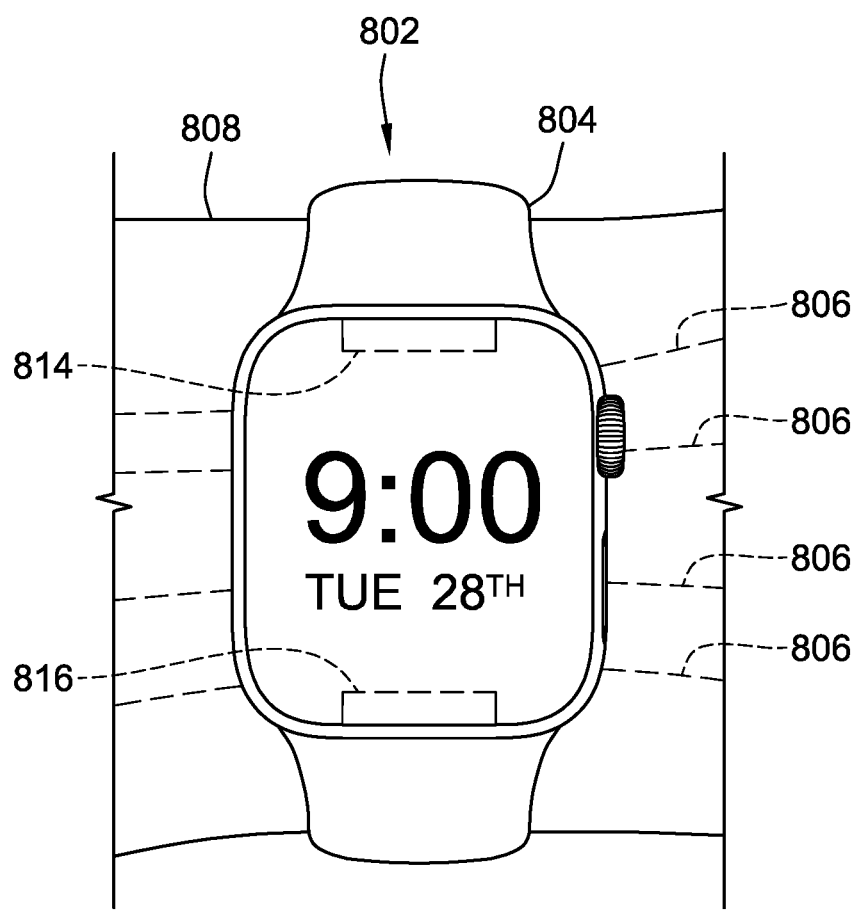
FIG. 8 depicts a wearable device 802 receiving user input via tendon movement of a user, according to some embodiments.

While the discussion of FIGS. 1-6 describes wearable devices including sensors that detect gesture-based user input, the discussion of FIGS. 7-9 describes a wearable device that is capable of detecting user input provided as movement of a tendons in a user's arm.

FIG. 7 depicts a wearable device 702 receiving user input via tendon movement of a user, according to some embodiments. In the example depicted in FIG. 7, the wearable device 702 is worn on a wrist 704 of the user. As depicted in FIG. 7, the user's arm (and thus wrist 704) includes a number of tendons: 1) a first tendon 706; 2) a second tendon 708; 3) a third tendon 710; and 4) a fourth tendon 712. Each of the tendons is associated with one of the user's fingers. In the simplified example depicted in FIG. 7, the first tendon 706 is associated with a first finger 714, the second tendon 708 is associated with a second finger 716, the third tendon 710 is associated with a third finger 718, and the fourth tendon 712 is associated with a fourth finger 720. Movement of the user's fingers (e.g., the user extending a finger, tapping a finger, closing a finger into their palm, etc.) causes movement of the tendons. Movement of the tendons causes the user's wrist to flex and/or contract in certain areas associated with the respective tendon.

The wearable device 702 includes a band 722. The wearable device 702 also includes one or more sensors (shown in FIG. 8) that are associated with the band 722. For example, the sensors can be located in the band 722, at an end of the band 722 (e.g., on the band 722 near a housing of the wearable device 702, on the band 722 where multiple portions of the band 722 connect), and/or on the wearable device 702. The sensors are generally configured to detect stress on the band 722. For example, the sensors can detect where the band 722 is stretching and/or the magnitude by which the band 722 is being stretched. Accordingly, movement of the user's fingers is detected by the sensors. Ultimately, the sensors detect this movement and the movement is used as user input for the wearable device 702.

While the discussion of FIG. 7 provides an overview of a wearable device that can receive user input via tendon movement of a user, the discussion of FIGS. 8-9 provide additional detail regarding such a wearable device.

FIG. 8 depicts a wearable device 802 receiving user input via tendon movement of a user, according to some embodiments. The wearable device 802 includes a band 804 and two sensors. The two sensors include a first sensor 814 and a second sensor 816. The sensors are configured to detect movement of tendons 806 in a user's wrist 808. As previously discussed, the sensors are configured to detect movement and/or stress on the band 804. As the user moves their fingers and/or wrist, one or more of the tendons 806 move within the user's wrist 808. The sensors detect this movement and the movement is used as user input for the wearable device 802.

Figure 9B:
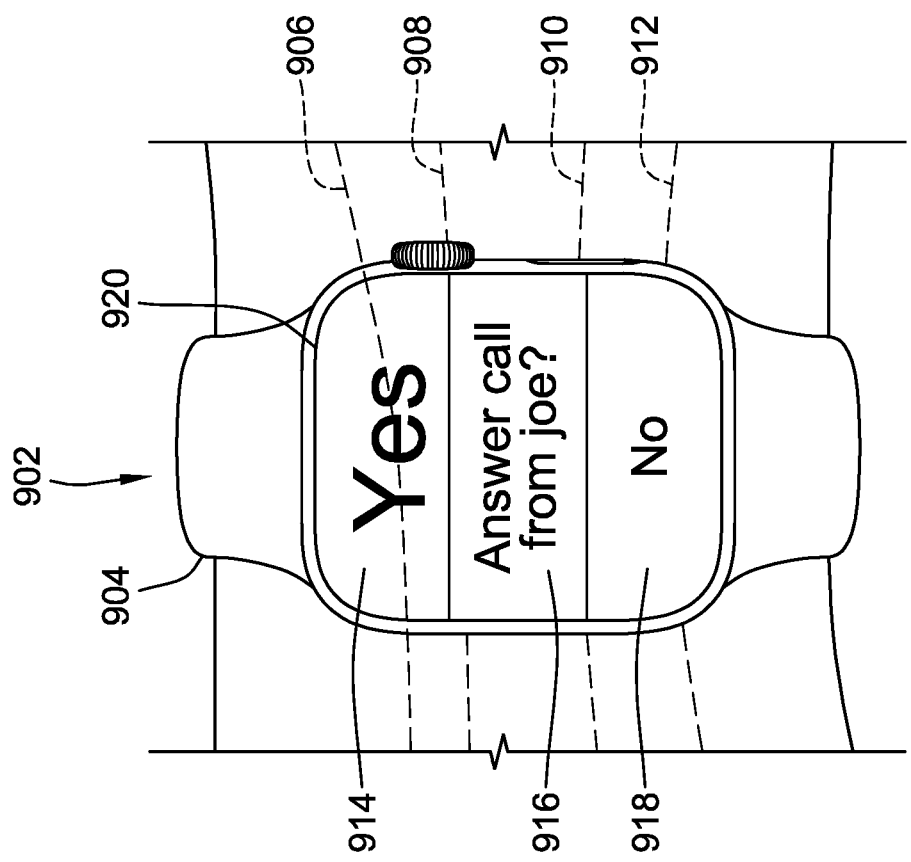
FIGS. 9A and 9B depict a wearable device 902 receiving user input via tendon movement of a user, according to some embodiments.
Figure 9A:
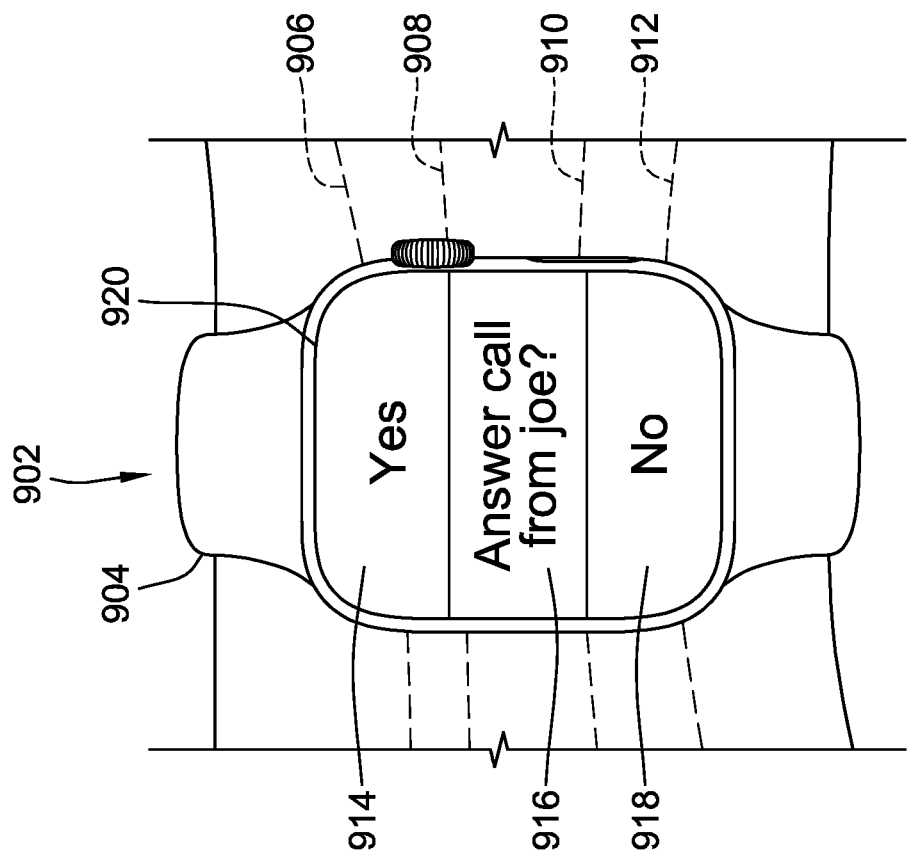

FIGS. 9A and 9B depict a wearable device 902 receiving user input via tendon movement of a user, according to some embodiments. The wearable device 902 includes a band 904 and a display device 920. The band 904 and/or wearable device 902 include one or more sensors (e.g., stretch sensors, motion sensors, etc.). The display device 920 is configured to present information to a user. For example, as depicted in FIGS. 9A and 9B, the information includes a user interface associated with an incoming phone call. The user interface includes three sections: 1) a first section 914; 2) a second section 916; and 3) a third section 918. The first section 914 includes a user selection to accept the phone call. The third section 918 includes a user selection to deny the phone call. The second section 916 includes a notification that an incoming call is being received.

In some embodiments, the display device 920 is capable of receiving user input (e.g., the display device 920 may be a touchscreen). Additionally, or alternatively, the user can provide user input without contacting the display device 920. As previously discussed, the wearable device 902 and/or band 904 includes sensors. The sensors are configured to detect movement of tendons in the user's wrist. As depicted in FIGS. 9A and 9B, the user's wrist includes four tendons: 1) a first tendon 906; 2) a second tendon 908; 3) a third tendon 910; and 4) a fourth tendon 912. The movement of the different tendons causes stress on the band 904 and/or the wearable device 902 in different manners and/or locations. As depicted in FIG. 9B, the user is making a movement (e.g., with a finger and/or their hand) that causes movement of the first tendon 906. This movement is detected, and the wearable device 902 (e.g., a control system of the wearable device 902) determines with which the tendon the movement is associated. Movement of the tendon causes the display device 920 to present information to the user in response to the identification of the tendon in the user's wrist. For example, as depicted in FIG. 9B, the first tendon 906 is moving and this movement is associated with the first section 914. Accordingly, the user has provided input to answer the incoming call.

In some embodiments, the wearable device 902 may not, by default, accept as user input movement of the tendons in the user's wrist. For example, the user may not always desire for their movements to be interpreted by the wearable device 902 as user input. In such embodiments, the wearable device 902 may be configured to receive user input to "place" the wearable device 902 in a mode where it accepts the user's tendon movement as user input. When such user input is received, the wearable device 902 transitions into a state (e.g., a "sensor state") in which the wearable device 902 is configured to detect user input of the user via tendon movement of the user. Such user input can take any suitable form (e.g., a touch command, an auditory command, an orientation of the user's wrist, etc.).

Figure 10:
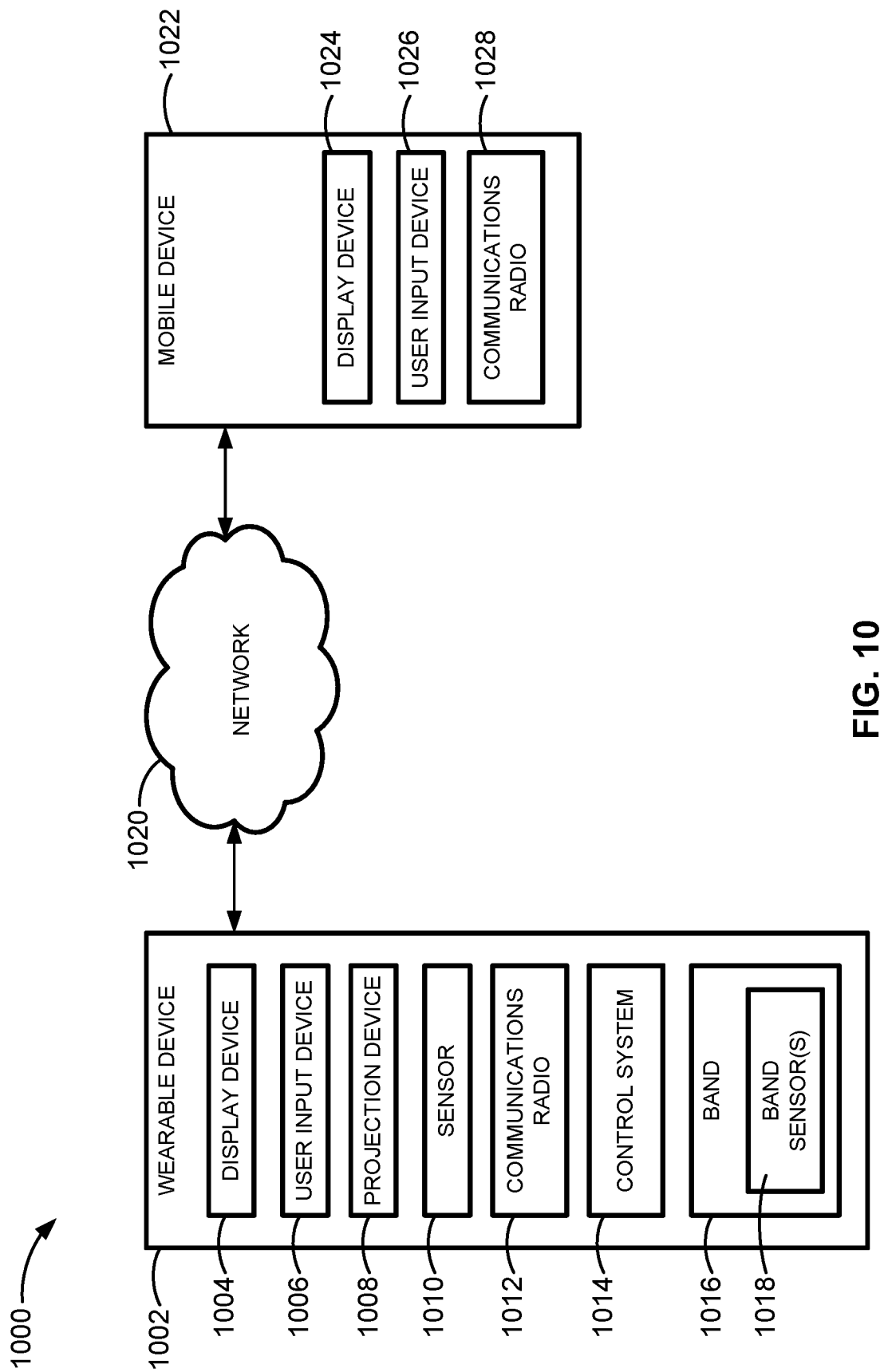
FIG. 10 is a block diagram of a system 1000, according to some embodiments.

While the discussion of FIGS. 1-9 provide detail regarding different user input mechanisms for a wearable device, the discussion of FIG. 10 provides additional detail regarding the structure of such wearable devices.

FIG. 10 is a block diagram of a system 1000, according to some embodiments. The system 1000 includes a wearable device 1002, a mobile device 1022, and a network 1020. The wearable device 1002 can be of any suitable type (e.g., a smartwatch, a smart ring, a badge, etc.). The mobile device 1022 can be of any suitable type (e.g., a smartphone, a laptop computer, a desktop computer, a tablet computer, an automotive infotainment system, a personal digital assistant (PDA), etc.). The wearable device 1002 is communicatively coupled to the mobile device 1022 via the network 1020. Accordingly, the network 1020 can be of any suitable type (e.g., a local area network (LAN), a wide area network (WAN), a wireless wide area network (WWAN), etc.) and can include wired and/or wireless links. It should be noted that, in some embodiments, the wearable device 1002 may not be communicatively coupled to the mobile device 1022. Similarly, in some embodiments, the wearable device 1002 can communicate directly with the mobile device 1022 (i.e., without communications passing through the network 1020).

The wearable device 1002 generally includes a display device 1004, a user input device 1006, a projection device 1008, sensors 1010, a communications radio 1012, a control system 1014, and a band 1016. The display device 1004 is generally configured to present information to a user. The user input device 1006 is generally configured to receive user input from the user. For example, the user input device can include hard buttons and/or soft buttons. The projection device 1008 is generally configured to present user selectable elements outside of a housing of the wearable device 1002. It should be noted that the wearable device 1002 can include more than one projection device 1008. The sensors 1010 are generally configured to detect selection of the user selectable elements. The sensors 1010 can be of any suitable type, such as proximity sensors, capacitance sensor, optical sensors, audio sensors, accelerometers, gyroscopes, magnetometers, etc. The communications radio 1012 is generally configured to transmit and/or receive data to/from the wearable device 1002. The control system 1014 is generally configured to perform the operations described herein. For example, the control system 1014 can be configured to interpret the user's selection of the user selectable elements and/or the movement of the tendons of the user's wrist.

The control system 1014 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control system 1014 is configured (for example, by using corresponding programming as will be well understood by those skilled in the art) to carry out one or more of the steps, actions, and/or functions described herein.

By one optional approach the control system 1014 operably couples to a memory. The memory may be integral to the control system 1014 or can be physically discrete (in whole or in part) from the control system 1014 as desired. This memory can also be local with respect to the control system 1014 (where, for example, both share a common circuit board, chassis, power supply, and/or housing) or can be partially or wholly remote with respect to the control system 1014 (where, for example, the memory is physically located in another facility, metropolitan area, or even country as compared to the control system 1014).

This memory can serve, for example, to non-transitorily store the computer instructions that, when executed by the control system 1014, cause the control system 1014 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The band is generally configured to secure the wearable device 1002 to the user. Accordingly, the band can be of any suitable type (e.g., a bracelet, a strap, a clip, a latch, etc.). In some embodiments, the band 1016 also includes band sensors 1018. For example, the band sensors 1018 are generally configured to detect movement of the user's wrist and/or tendons within the user's wrist.

The mobile device generally includes a display device 1024, a user input device 1026, and a communications radio 1028. The display device 1024 is generally configured to present information (e.g., notifications, messages, user interfaces, etc.) to the user. The user input device 1026 is generally configured to receive user input from the user. The communications radio 1028 is generally configured to transmit and/or receive data to/from the mobile device 1022.

While the discussion of FIG. 10 provides additional detail regarding the structure of wearable devices, the discussion of FIG. 11 provides additional detail regarding receiving selection of a user selectable element.

FIG. 11 is a flow chart depicting example operations for receiving a selection of a user selectable element, according to some embodiments. The flow begins at block 1102.

At block 1102, a device is provided. The device can be, for example, a wearable device. The device includes a projection device and sensors. The projection device is generally configured to present user selectable elements outside of a housing of the device. The sensors are generally configured to detect a selection of the user selectable element. The flow continues at block 1104.

At block 1104, user selectable elements are presented. For example, the projection device can present the user selectable elements. The user selectable elements are presented outside of the housing of the wearable device. The user selectable elements can take any suitable form. In one embodiment, the projection devices are light-based and present visual user selectable elements to the user. The flow continues at block 1106.

At block 1106, selection of a user selectable element is detected. For example, the sensor can detect selection of the user selectable element. The sensors can be of any suitable type and thus detect selection of the user selectable element in any suitable manner. For example, the sensor can be a proximity sensor, a capacitance sensor, an optical sensor, an audio sensor, an accelerometer, a gyroscope, a magnetometer, etc.

In some embodiments, a device comprises a housing, a display device secured to the housing, wherein the display device is configured to present information to a user, a projection device, wherein the projection device is configured to present a user selectable element outside of the housing of the device, and a sensor, wherein the sensor is configured to detect a selection of the user selectable element by the user.

In some embodiments, an apparatus and a corresponding method for receiving a selection of a user selectable element associated with a device comprises providing the device, wherein the device comprises a housing, a display device secured to the housing and configured to present information to a user, a projection device, and a sensor, presenting, by the projection device, the user selectable element outside of the housing of the device, and detecting, by the sensors, the selection of the user selectable element by the user.

In some embodiments, a device comprises a housing, a band, wherein the band is configured to secure the housing on a wrist of a user, a display device, wherein the display device is configured to present information to the user, and a sensor, wherein the sensor is associated with the band and configured to detect a selection by the user based on movement of tendons in the wrist of the user.

Those skilled in the art will recognize that a wide variety of other modifications, alterations, and combinations can also be made with respect to the above described embodiments without departing from the scope of the disclosure, and that such modifications, alterations, and combinations are to be viewed as being within the ambit of the inventive concept.

What is claimed is:

1. A device comprising:
    a housing;
    a display device secured to the housing, wherein the display device is configured to present information to a user;
    a plurality projection devices, wherein each projection device of the plurality of projection devices is configured to present a user selectable element outside of the housing of the device; and
    a plurality of sensors, wherein each sensor of the plurality of sensors is configured to detect a selection of one of the user selectable elements by the user, wherein there is a one-to-one correspondence between the plurality of projection devices, the plurality of sensors, and a number of user selectable elements presented.

2. The device of claim 1, wherein the projection device emits light, and wherein the user selectable element is indicated by the light emitted by the projection device.

3. The device of claim 1, wherein the sensor is one or more of a proximity sensor, a capacitance sensor, an optical sensor, an audio sensor, an accelerometer, a gyroscope, a pressure sensor, and a magnetometer.

4. The device of claim 1, wherein the user selectable element includes a plurality of user selectable elements, and wherein each of the plurality of user selectable elements is visually distinguishable from others of the plurality of user selectable elements.

5. The device of claim 4, wherein each of the plurality of user selectable elements is visually distinguishable from others of the plurality of user selectable elements by one or more of design, shape, color, size, position, transparency, and location.

6. The device of claim 1, wherein the plurality of projection devices are arranged about the device such that each quadrant of the device includes one of the plurality of projection devices.

7. The device of claim 1, wherein the user selectable element is presented on a wrist of the user.

8. The device of claim 7, wherein the user selects the user selectable element by tapping a region of the wrist upon which the user selectable element is presented.

9. The device of claim 1, further comprising:
    a second sensor, wherein the second sensor is located within the housing of the device, and wherein the second sensor is configured to receive user input for the device.

10. The device of claim 2, wherein the second sensor is located in a bezel of the device.

11. A method for receiving a selection of user selectable elements associated with a device, the method comprising:
    providing the device, wherein the device comprises a housing, a display device secured to the housing and configured to present information to a user, a plurality of projection devices, and a plurality of sensors;
    presenting, by each of the plurality of projection devices, a user selectable element of the plurality of user selectable elements outside of the housing of the device, wherein there is a one-to-one correspondence between the plurality of projection devices, the plurality of sensors, and a number of user selectable elements presented; and
    detecting, by a sensor of the plurality of sensors, selection of one of the user selectable elements associated with a respective one of the plurality of projection devices by the user.

12. The method of claim 11, wherein the projection device emits light, and wherein the user selectable element is indicated by the light emitted by the projection device.

13. The method of claim 11, wherein the sensors is one or more of a proximity sensor, a capacitance sensor, an optical sensor, an audio sensor, an accelerometer, a gyroscope, and a magnetometer.

14. The method of claim 11, wherein the user selectable element includes a plurality of user selectable elements, and wherein each of the plurality of user selectable elements is visually distinguishable from others of the plurality of user selectable elements.

15. The method of claim 14, wherein each of the plurality of user selectable elements is visually distinguishable from others of the plurality of user selectable elements by one or more of design, shape, color, size, position, transparency, and location.

16. The method of claim 11, wherein the plurality of projection devices are arranged about the device such that each quadrant of the device includes one of the plurality of projection devices.

17. The method of claim 11, wherein the user selectable element is presented on a wrist of the user.

18. The method of claim 17, wherein the user selects the user selectable element by tapping a region of the wrist upon which the user selectable element is presented.

19. A device comprising:
    a housing;
    a band, wherein the band is configured to secure the housing on a wrist of a user;
    a display device, wherein the display device is configured to present information to the user; and
    a sensor, wherein the sensor is associated with the band and configured to detect a selection by the user based on an amount of stretch induced on the band by movement of tendons in the wrist of the user.

20. The device of claim 19, wherein the sensor is one or more of a pressure sensor, a stress sensor, a capacitance sensor, an accelerometer, an accelerometer, a gyroscope, and a magnetometer.

21. The device of claim 19, further comprising:
a control system, wherein the control system is configured to:
- receive, from the sensor, an indication of the movement of the tendons in the wrist of the user;
- identify which tendon in the wrist of the user is moving, wherein selection by the user is based on the identification of the tendon in the wrist of the user; and
- cause the display device to present the information to the user in response to the identification of the tendon in the wrist of the user.

22. The device of claim 19, further comprising:
a user input device configured to receive, from the user, user input; and
a control system, wherein the control system is configured to:
- receive, from the user, first user input via the user input device; and
- transition, based on the first user input, the wearable device to a sensor state, wherein when in the sensor state the wearable device is configured detect the selection by the user via the sensor.

23. The device of claim 22, wherein the user input is one or more of a touch command, an auditory command, and an orientation of the wrist of the user.

* * * * *